United States Patent Office 2,749,286
Patented June 5, 1956

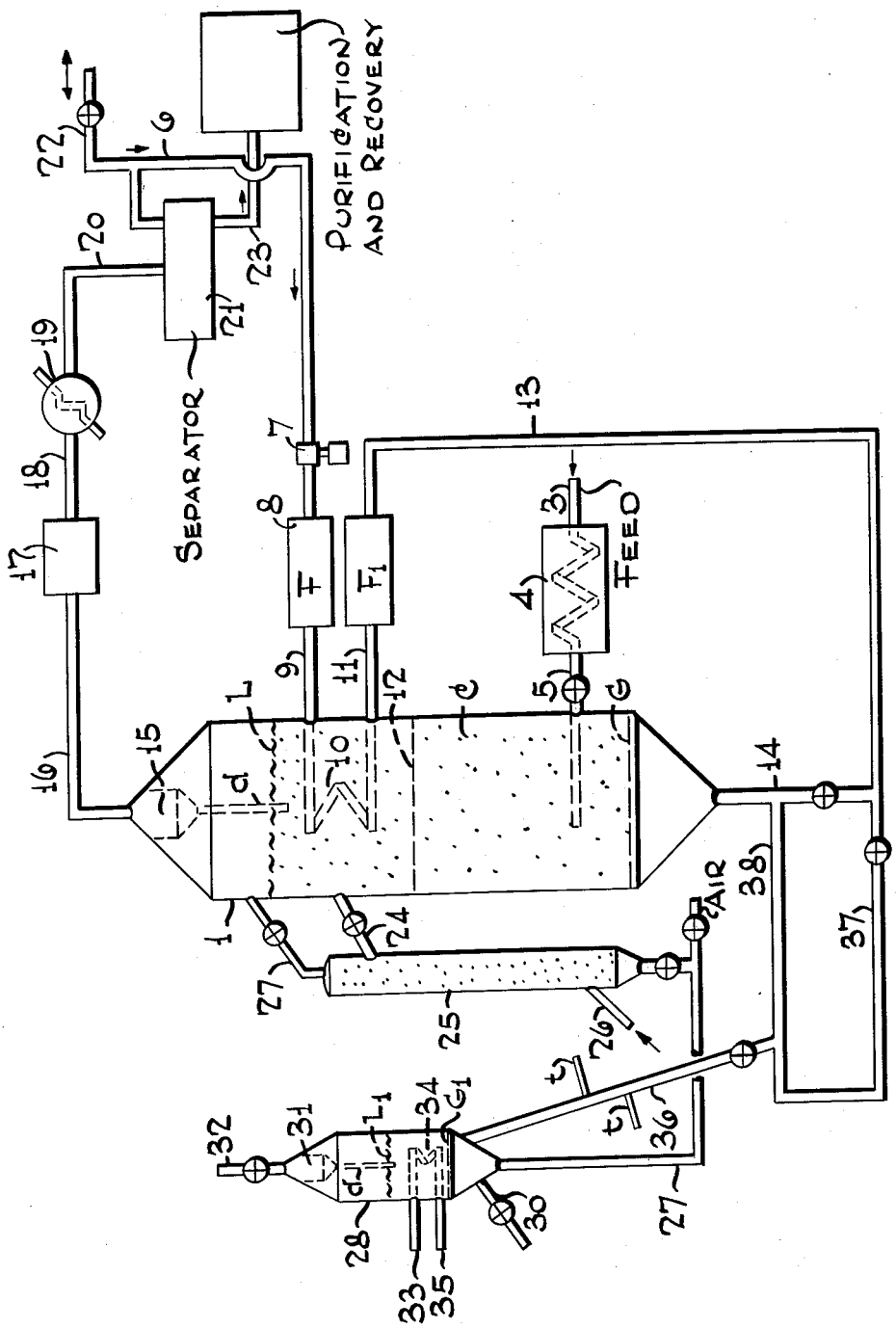

2,749,286

INVERSE GRADIENT FLUID HYDROFORMING REACTOR

Charles E. Hemminger, Westfield, N. J., assignor to Esso Research and Engineering Company, a corporation of Delaware Application August 10, 1951, Serial No. 241,237

13 Claims. (Cl. 196—50)

The present invention relates to improvements in the hydroforming of naphthas and it has particular reference to carrying out the hydroforming operation in the presence of a fluidized bed of catalyst while maintaining an inverse temperature gradient in the bed of catalytic material.

It is well known, of course, that the hydroforming reaction is an endothermic reaction. It is also generally recognized that hydroforming not only involves dehydrogenation of naphthenes containing six carbon atoms in the ring, but also involves an isomerization of five membered rings to form six membered rings, as, for example, where methylcyclopentane isomerizes to cyclohexane. The isomerization reaction requires less heat input than does the dehydrogenation reaction, which is a highly endothermic reaction. Besides the reactions previously mentioned, a certain amount of hydrocracking of the paraffins present in the naphtha feed occurs. This hydrocracking reaction is exothermic and is desirable, since (1) it improves the volatility of the product gasoline, and (2) it tends to prevent volume decrease of the product. With respect to the latter, when a naphthene such as methyl cyclohexane is dehydrogenated to yield toluene, the latter has a higher density than the methylcyclohexane, and hence there is a volume decrease during this dehydrogenation. The hydrocracking, however, of paraffins and other hydrocarbons in the feed increases the liquid yield volumetrically, and tends to offset the volume loss caused by the methyl cyclohexane dehydrogenation, or similar dehydrogenations.

The present invention is based on the use of a fluidized catalyst, but, as stated previously, it includes the concept of employing an inverse temperature gradient. In other words, the reactor is so operated that the top of the bed is at a higher temperature than the lower portions of the bed. This, of course, is the converse of what is ordinarily the case where a fluidized bed is employed, because it is one of the attributes of a fluidized bed that due to the very intimate mixing of all portions thereof, the bed possesses a substantially uniform temperature throughout. As will be explained hereinafter, the present invention contemplates the use of a grid placed or disposed in the bed somewhat above the middle in order to retard back-mixing, and further includes the application of extraneous heat to that portion of the bed which is above the grid or other means employed to inhibit the back-mixing.

In feed to the bed, as will appear hereinafter, is, as usual, to a lower portion of the bed. In this lower portion isomerization of normal paraffins and cycloparaffins or naphthenes is carried out at lower than the average hydroforming temperature. In the upper portion of the bed, the dehydrogenation reaction is the dominant reaction; and it can be consummated at higher temperatures than the average without excessive gas formation because the sensitive five carbon ring naphthenes have been substantially converted to six ring naphthenes at the lower temperature in the lower portion of the bed.

An object of the present invention is to employ a fluidized bed of catalyst in a hydroforming operation so as to produce a higher yield of product of the same octane number than has been previously attainable.

Another important object of the present invention is to employ a minimum amount of recycle gas and thus reduce the cost of heating the recycled hydrogen-containing gas.

Another object of the present invention is to employ a reactor for the hydroforming of decreased size, which will have the same capacity as larger sized reactors currently employed or contemplated.

Other objects of the invention will appear in the following more detailed description and claims.

In the accompanying drawing there is shown diagrammatically an apparatus layout in which a preferred modification of the invention may be carried into effect.

Referring to the drawing in detail, 1 represents a reactor which contains a fluidized bed of catalyst C hereinafter described in detail. As usual, the reactor is provided with a gas distributing means G which may take the form of a grid or screen or any equivalent device. The hydrocarbon oil to be hydroformed enters the system through line 3, is vaporized and superheated in furnace 4 to a temperature of about 850°–1050° F., and thereafter is charged to reactor 1 through line 5 at a lower point of the fluidized bed of catalyst C, but above the gas distributing means G. Simultaneously, hydrogen-containing gas, which is recovered from a separator 21, passes via line 6 through the compressor 7 and then into a furnace 8 where it is heated to a temperature of about 1300° F. Thereafter the hydrogen-containing gas is fed via line 9 to a coil 10 disposed in the upper portion of the bed of catalyst C. This heating means may take the form of several grid pancake coils operating in series or parallel, or it may be a tubular type of exchanger with distribution headers so arranged that only the gas inlet line 9 and the gas outlet line 11 from the coil 10 enter the shell of the reactor. The result of passing the hot gas through the coil 10 is to transmit heat to the upper portion of bed C so that it has a higher temperature than the lower portion of the bed, as will appear hereinafter. In order to aid in this result, the reactor 1 is provided with an intermediate grid 12 or similar means, including packing, which serves to retard back-mixing of catalyst and thus to aid in causing the bed to have an inverse temperature gradient, that is to say, a higher temperature at the top portion of the bed than at the lower portion. This is of advantage because, as stated, the $C_5$ ring naphthenes in the fresh feed which are less thermally stable than $C_6$ ring hydrocarbons are contacted with a lower temperature than the average temperature of the reactor, and are, therefore, less apt to form cracked degradation products. Instead they are isomerized to $C_6$ ring naphthenes rather than converted to coke and fixed gases as would occur if they contacted with the catalyst at the same or higher temperature than the average catalyst temperature in the reactor. Consequently, at the same octane number, increased product yields of 2–5 volume per cent of $C_5$–400° F. motor gasoline are attained by this inverse temperature gradient operation.

The hot recycle gas is withdrawn as stated from coil 10 or its equivalent through line 11 and reheated in a second furance $F_1$ to a temperature of about 1300° F. and then withdrawn through line 13 and passed into the bottom of the reactor through valved line 14 where it passes upwardly through the grid G into the body of catalyst C at such a superficial velocity as to maintain the said catalyst in a fluidized state. The catalyst C should have a particle size of from about 20–120 microns, preferably, the catalyst is microspherical with less than 5% of less than 40 micron size, and less than 3% particles larger than 100 microns, the remainder having a particle size of from 40–100 microns. The recycle hydrogen gas and the oil vapors flow through the reactor 1 in contact with the catalyst at a superficial velocity of from about 0.3–1 ft. per second. Under conditions more fully set forth hereinafter in the below specific example, the desired conversion takes place and the crude product and the normally gaseous material emerge from the bed of catalyst C having an upper dense phase level at L and pass into a disengaging space located between L and the top of the reactor. In this disengaging space the concentration of catalyst in gasiform material decreases sharply upwardly. In order to remove entrained catalyst, there is disposed as usual one or more "cyclone" separators 15 through which the issuing crude product is forced in order to separate out catalyst, which catalyst is returned to the dense phase via one or more dip pipes d. The gasiform material finally emerges from reactor 3 through line 16 and passes through a scrubber 17 wherein the last traces of catalyst are removed by, for example, a scrubbing oil and thereafter the scrubbed gasiform material passes via line 18 into a cooler 19 wherein the product is sufficiently cooled to condense the normally liquid constituents. It will be understood that the cooling in 19 may be effected at least in part by passing the cold feed in line 3 in heat exchange relationship with the hot vapors passing through the product cooler 19. The cool product is withdrawn from the cooler 19 through line 20 and passed into a separator 21. As previously indicated, the hydrogen gas to be recycled is withdrawn from the separator through line 6. A portion of this hydrogen may be rejected from the system through line 22. In starting up the process extraneous hydrogen may be fed to the system through line 22. After the process has been in operation, however, extraneous hydrogen is not required, and in fact, there is a net production of hydrogen over and above that required in the process. The crude product is withdrawn from the bottom of separator 21 through line 23 and delivered to conventional distillation and other purifying operations, which because they are conventional, need not be described in detail herein.

An advantage of the present invention is that the 925° F. temperature existing at the top of the reactor enables the use of a reactor of reduced volume; in other words, less reactor space is required. Still another advantage of the present invention is that the feed to the reactor is not subjected during the preheat to temperatures causing degradation of said feed to coke, fixed gases and other undesired products.

To illustrate still another advantage of the present invention it is pointed out that normally about 4,000 cu. ft. of recycled hydrogen gas (65–95% purity) is charged to the reactor with each barrel of oil. Most of the heat required to sustain the reaction in the conventional operation is carried into the reactor as sensible heat in this 4,000 cu. ft. of hydrogen per barrel of oil. This amount is normally used where the catalyst to oil ratio is from 1 to 3 parts by weight of catalyst to one part of oil. The hydrogen gas is recovered from the purification system at a relatively low temperature. Now this gas has to be heated to around 1300° F., and it also has to be compressed. This 4,000 cu. ft. of gas in the conventional process enters the reactor at a temperature of around 1300° F. and gives up heat to the extent that its temperature approaches about 925° F., or there is a temperature drop of about 375° F., where in the present invention, about 2,000 cu. ft. of gas is fed into the coil at the top of the reactor at a temperature of 1300° F. and withdrawn at a temperature of about 950° F., there is a temperature drop of about 350° F. As stated above, this gas is then reheated to 1300° F., injected into the bottom of the reactor, where it gives up heat to the extent that it is cooled to 900° F., or takes a temperature drop of about 400° F. Thus, the available heat with 4,000 cu. ft. per barrel of oil and a 375° F. temperature difference in the conventional process is equal to 2,000 cu. ft. per barrel of oil with two temperature drops, namely, 350° F. and 400° F., a total 750° F. temperature drop, or twice the 375° F. temperature drop which is incurred in the conventional process. Thus, the present invention permits a saving in heating of the cold gas to be recycled, for only 2,000 cu. ft. of gas is heated from, say atmospheric temperature to 1300° F., cooled to 925° F., and reheated to 1300° F. Hence, there is an important saving in the amount of cold gas which must be reheated to introduce the same amount of heat into the reactor, as in the conventional process. Furthermore, and equally important, is the fact that a much smaller quantity of gas must be compressed where only about 2,000 cu. ft. of hydrogen-containing gas is recycled as compared to 4,000 cu. ft. or more.

Periodically, the catalyst will require regeneration and this is conveniently accomplished by withdrawing catalyst from the reactor 1 and passing it to a regeneration vesssel in a manner presently described. In regenerating the catalyst, the same is withdrawn through a valved line 24 and passed into the top of a stripper 25. Any convenient stripping gas may be employed to dislodge occluded vapors or vapors otherwise associated with the catalyst. A good stripping gas is steam and this is charged into the bottom of the stripper 25 through line 26 where it passes upwardly countercurrent to the downflowing catalyst. The stripping gas and the stripped products are withdrawn from the upper portion of stripper 25 through line 27 and charged into the upper portion of reactor 1, as indicated, in the drawing. The stripped catalyst is withdrawn from the bottom of stripper 25 and charged into an air stream in line 27 and thereafter carried in suspension into the bottom of the regeneration vessel 28. The regeneration vessel 28 is similar in form and construction to reaction vessel 1, being provided with a gas distributing means $G_1$ similar to G of reactor 1, and the catalyst is similarly formed into a dense fluidized bed having an upper dense phase level at $L_1$ brought about by controlling the gas velocity in vessel 28 in the same manner as previously described in connection with the description of the operation in reactor 1. Insufficient air to burn off the carbonaceous deposits, which are formed on the catalyst during the hydroforming operation, is introduced into line 27 to prevent excessive burning of the carbon in the transfer line 27. Then, supplementary air is introduced into the bottom of regenerator 28 through line 30. The fumes resulting from the combustion of the carbonaceous deposits on the catalyst formed during regeneration of the catalyst in regenerator 28 are passed from the dense phase into an upper disengaging space located between level L and the top of the reactor, and these fumes are forced through one or more "cyclone" separators 31 wherein entrained catalyst is removed and the fumes are discharged from the regenerator through line 32. The entrained catalyst is returned to the dense bed through one or more dip pipes d. In order to control the temperature of the regeneration, a cooling medium may be introduced through line 33 into a cooling grid 34 disposed in the fluidized bed of catalyst undergoing regeneration to abstract heat and prevent overheating of the catalyst, and this cooling medium may be withdrawn through line 35, cooled and recirculated through line 33. This cooling medium circulated through grid 34 may be any conventional cooling fluid, such as mercury, diphenyloxide, water, etc. The regenerated catalyst is withdrawn from the regenerator 28 through a standpipe 36 provided with the usual spaced gas taps t through which relatively small amounts of gas may be introduced into the column of downflowing catalyst to improve its fluidity, whereupon the catalyst discharges into a branch stream of recycled gas in 37, and in this gas stream the regenerated catalyst is carried in suspension in line 38 into line 14 and thereafter into the reactor.

It is obvious to anyone skilled in the art that different modifications of reactor 1 may be used to obtain the same divided bed results. For example, two reactors may be employed in series, in which case grid 12 becomes an exit of the first and the inlet of the second reactor.

In order further to explain the invention, the following specific example is set forth:

Feed:

| | |
|---|---:|
| A. P. I. ° | 55.0 |
| I. B. P.[1], °F | 227 |
| 10% off at | 241 |
| 50% off at | 262 |
| 90% off at | 305 |
| F. B. P.[2] | 333 |
| CFRR ON, clear | 49 |
| Aromatics, wt. per cent | 8.5 |
| Naphthenes, wt. per cent | 44.0 |
| Paraffins, wt. per cent | 47.5 |

[1] I. B. T. is initial boiling point.
[2] F. B. P. is final boiling point.

Comparison is made below in two runs in which hydroforming of the above feed to give 95 CFRR octane number clear C4-end point motor gasoline in (1) an isothermal operation and (2) an inverse temperature gradient operation, using a catalyst in both runs which was 10% $MoO_3 \cdot 90\%$ $Al_2O_3$, by weight, and in which the pressure, the amount of hydrogen recycled gas per barrel of oil and the contact time was the same.

| Operation | Isothermal | Inverse Temperature Gradient |
|---|---:|---:|
| Average temp., °F | 900 | 900 |
| Bottom temp., °F | 900 | 875 |
| Top temp., °F | 900 | 925 |
| Yields on fresh feed: | | |
| C4–E. P. gasoline, vol. percent | 84.6 | 86.5 |
| Total C4 | 8.0 | 6.9 |
| Dry gas, wt. percent | 11.7 | 10.5 |
| Carbon, wt. percent | 1.0 | 0.9 |
| C4–E. P. Gasoline: | | |
| A. P. I. ° | 49.9 | 50.2 |
| R. V. P. p. s. i.[1] | 9.3 | 7.5 |

[1] R. V. P. is Reid vapor pressure.

Attention is directed to the lower carbon, lower gas formation, and lower R. V. P. with the inverse temperature gradient operation, permitting gasoline yield increase by butane addition.

While the foregoing example illustrates the invention and the best mode of performing the same, it is to be understood that modifications of the precise conditions therein set forth may be varied without departing from the spirit of the invention. Thus, the temperature at the top of the reactor may vary from 875°–1000° F. and at the bottom may vary from 850°–950° F. Furthermore, the pressure may vary from 100–500 p. s. i. The amount of recycled gas is always less than the amount used in the conventional process operated under otherwise the same conditions as the present process. The purity of the hydrogen fed with the oil, that is, the "recycled" gas is such that it contains from 60–95% hydrogen, preferably, from 70–75% hydrogen. This recycled hydrogen-containing gas is, preferably, scrubbed to remove hydrocarbons.

While in the foregoing specific example the catalyst was molybdena on alumina, it will be appreciated that a large number of catalysts are available for this hydroforming operation. Thus, the process may be carried out in the presence of such catalysts as molybdenum oxide, chromium oxide, nickel sulfide, or tungsten sulfide, or any of a number of oxides or sulfides of metals of groups IV, V, VI, VII and VIII of the periodic system. These catalysts are usually supported on a base or spacing agent and the most commonly used base is alumina, either of the gel type or precipitated alumina. For example, a modified alumina, made by heat treating hydrated aluminum oxide, has been used as a support or extending agent for the active reforming catalysts mentioned above. Thus, as stated, a good catalyst for reforming or hydroforming is one containing about 10% molybdenum oxide supported on an alumina base. However, alumina in its various forms is not heat-stable, particularly at regeneration temperatures which are of the order of 1100–1400° F. At temperatures in the neighborhood of 1200° F. or higher, alumina is definitely impaired by prolonged heating, and this impairment is reflected in the loss of activity of the catalyst composition of which the alumina is the support or spacing agent. The preferred catalyst to be used in the present process which would be, therefore, one which has a heat stabilized base. In other words, one containing in addition to alumina, silica, zirconia, chromia, or it may be a spinel type base, such as where the alumina is chemically combined with, say, zinc to form zinc aluminate. Varying amounts of the other oxides mentioned may be used. Thus, in the case of silica, 5% of $SiO_2$ mixed with 95% of $Al_2O_3$ improves the latter from the standpoint of heat stability.

What is claimed is:

1. The method of increasing the aromaticity of a naphtha containing cyclo-hexanes and alkyl cyclo-pentanes which comprises providing a fluidized bed of powdered hydroforming catalyst, simultaneously feeding thereto a preheated oil and a hydrogen-containing gas, causing the hydrocarbon vapors and the hydrogen-containing gas to flow in contact with said bed of catalyst at a rate sufficient to maintain the catalyst in the said fluidized state, maintaining the said upper portion of the said bed at a higher temperature than the said lower portion thereof and restricting back-mixing of the said upper portion of said bed with the lower portion thereof by means disposed at an intermediate point in said bed, permitting the reactants to remain in contact with the fluidized bed of catalyst for a sufficient period of time to effect the desired conversion and recovering from said fluidized bed of catalyst, a hydroformed product.

2. The method of increasing the aromaticity of naphtha containing alkyl cyclopentanes which comprises providing a fluidized bed of powdered hydroforming catalyst, feeding a preheated oil containing naphthenes to said fluidized bed of catalyst, feeding a heated hydrogen-containing gas to an upper portion of said fluidized bed in heat exchange relationship with said bed to impart heat to said upper portion of said bed, withdrawing the hydrogen-containing gas, reheating the hydrogen-containing gas, feeding the reheated hydrogen-containing gas to a lower portion of said bed in direct contact therewith, maintaining the said upper portion of the said bed at a higher temperature than the said lower portion thereof and restricting back-mixing of the said upper portion of said bed with the lower portion thereof by baffle means disposed at an intermediate point in said bed permitting the said preheated oil, the said hydrogen gas and the catalyst to remain in contact with each other for a sufficient period of time to effect the desired conversion and recovering from the said fluidized bed of catalyst, a hydroformed product.

3. The method set forth in claim 1 in which the temperature in the upper portion of the fluidized bed of catalyst is maintained above about 50° F. higher than the temperature prevailing in the lower portion of the bed.

4. The method set forth in claim 2 in which the temperature in the upper portion of the fluidized bed of catalyst is maintained about 25° F. higher than the temperature prevailing in the lower portion of the bed.

5. The method set forth in claim 1 in which the amount of hydrogen-containing gas fed to the fluidized bed of catalyst is from about 1500–5000 cubic feet per barrel of oil.

6. The method set forth in claim 2 in which the amount of hydrogen-containing gas fed to the fluidized bed of catalyst is from about 1500–5000 cubic feet per parrel of oil.

7. In the catalytic hydroforming of naphthas containing cyclo-hexanes and alkyl cyclo-pentanes wherein the naphthas in vapor form are contacted with a fluidized bed of hydroforming catalyst in the hydroforming zone under hydroforming conditions of temperature and pressure, the improvement which comprises supplying at least a portion of the heat necessary to support the reaction by first passing in heat exchange relationship with an upper portion of said bed of catalyst, a preheated hydrogen-containing gas in an amount of from about 1500–3000 cubic feet per each barrel of oil fed to the reaction zone, withdrawing the hydrogen-containing gas from the upper portion of said fluidized bed, reheating it and feeding it into contact with a lower portion of a fluidized bed of catalyst, the upper portion of the bed being heated to a higher temperature than the lower portion of said bed and restricting back-mixing of the upper portion of the fluidized bed of catalyst with the lower portion thereof by disposing at an intermediate point of said bed, flow restricting means, permitting the reactants to remain in contact with the fluidized bed of catalyst for a sufficient period of time to effect the desired conversion and recovering from the said fluidized bed of catalyst, a hydroformed product.

8. The method set forth in claim 7 in which the hydrogen-containing gas is fed to the upper and lower portions at a temperature of about 1300° F.

9. The method set forth in claim 7 in which about 2000 cubic feet of hydrogen-containing gas per barrel of oil feed is fed to the reaction zone.

10. The method set forth in claim 7 in which the catalyst is periodically withdrawn from an upper portion of said fluidized bed, stripped with a gas to remove occluded hydrocarbons, regenerated to remove carbonaceous deposits by treatment with an oxygen-containing gas and thereafter returned to a lower portion of said fluidized bed.

11. The method set forth in claim 2 in which the catalyst is a VI group metal oxide carried on a heat stabilized alumina base.

12. The method set forth in claim 7 in which the catalyst is a VI group metal oxide carried on a heat stabilized alumina base.

13. The method set forth in claim 1 in which catalyst and oil are fed to the reactor in the ratio of from about 1 to 3 parts of catalyst to 1 part of oil by weight.

References Cited in the file of this patent

UNITED STATES PATENTS

| | | |
|---|---|---|
| 2,285,727 | Komarewsky | June 9, 1942 |
| 2,326,628 | Egloff | Aug. 10, 1943 |
| 2,341,193 | Scheineman | Feb. 8, 1944 |
| 2,364,453 | Layng et al. | Dec. 5, 1944 |
| 2,418,534 | Watson | Apr. 8, 1947 |
| 2,421,677 | Belchetz | June 3, 1947 |

FOREIGN PATENTS

| | | |
|---|---|---|
| 574,892 | Great Britain | Jan. 24, 1946 |